Figure 1:
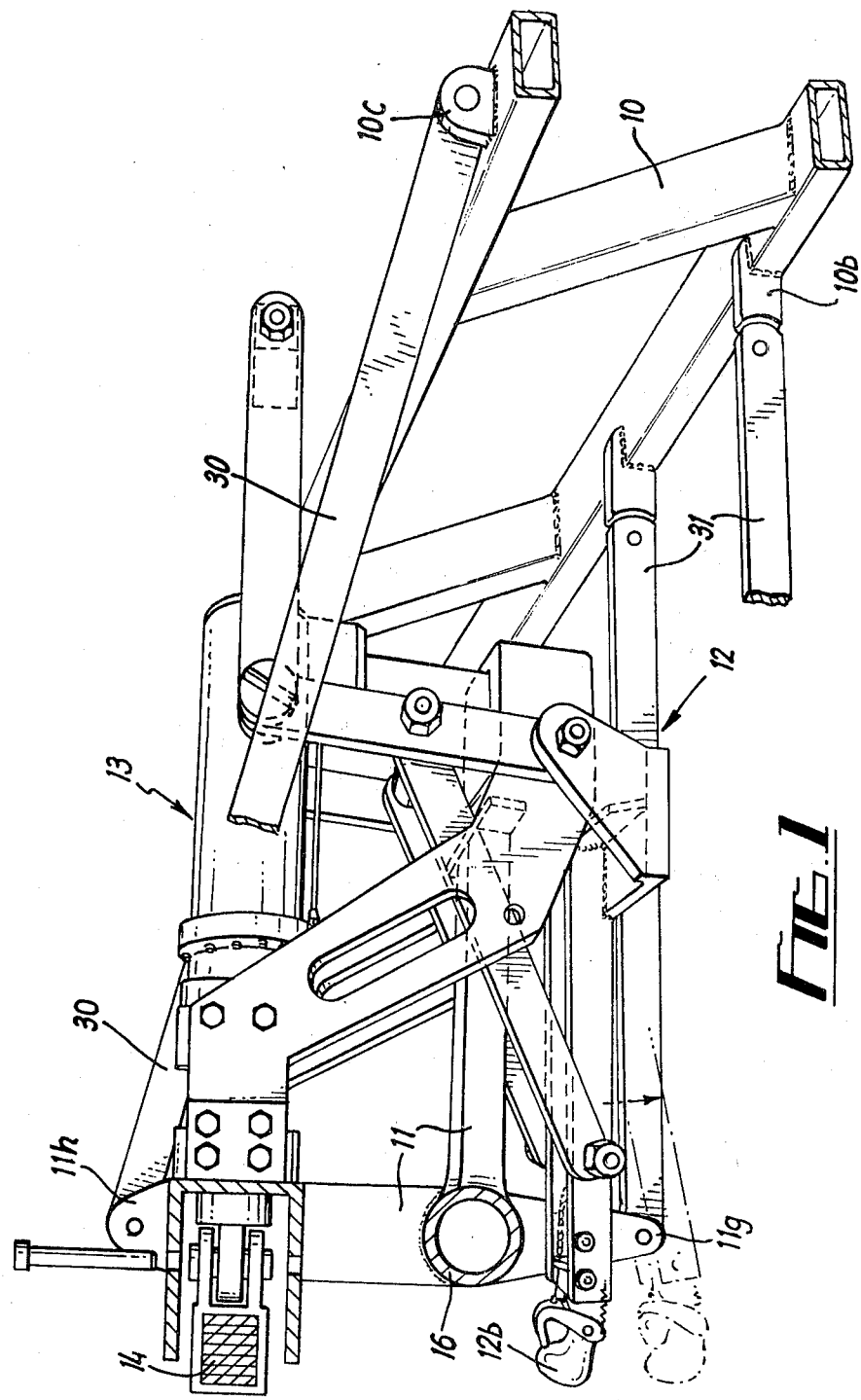

United States Patent [19]

Taylor

[11] 4,423,886

[45] Jan. 3, 1984

[54] PICK-UP HITCH MOUNTING ARRANGEMENT

[75] Inventor: William S. H. Taylor, Stockport, England

[73] Assignee: W. S. H. Taylor Engineering Developments Ltd., Stockport, England

[21] Appl. No.: 360,359

[22] Filed: Mar. 22, 1982

[30] Foreign Application Priority Data

Mar. 23, 1981 [GB] United Kingdom ................ 8109061

[51] Int. Cl.³ .............................................. B60D 1/00
[52] U.S. Cl. .................................. 280/496; 172/439; 280/503
[58] Field of Search ............... 280/496, 503, 116, 132; 172/439, 448, 678

[56] References Cited

U.S. PATENT DOCUMENTS 2,440,550 4/1948 Martin ................................ 280/496
2,768,568 10/1956 Heitshu .............................. 172/448
2,904,117 9/1959 Balzer .................................. 280/503

FOREIGN PATENT DOCUMENTS 911989 7/1946 France ............................... 280/496
1370363 10/1974 United Kingdom .

*Primary Examiner*—John A. Pekar
*Assistant Examiner*—D. Lynn Fugate
*Attorney, Agent, or Firm*—Pearson & Pearson

[57] ABSTRACT

A pick-up hitch arrangement for a vehicle comprises a rigid support frame which is secured to a driven axle of the vehicle and has a pick-up hitch pivotally mounted thereon. The support frame is pivotally attached to the body part or chassis of the vehicle by means of pairs of upper and lower links. Each respective upper and lower link extend in directions which converge in vertical alignment with or forwardly of the center of gravity of the vehicle to reduce the tendency of a load applied to hook causing stretching of the vehicle rear springs and inclination of the chassis. The upper links converge above or rearwardly of the axle to give lateral stability to the hitch arrangement.

12 Claims, 4 Drawing Figures

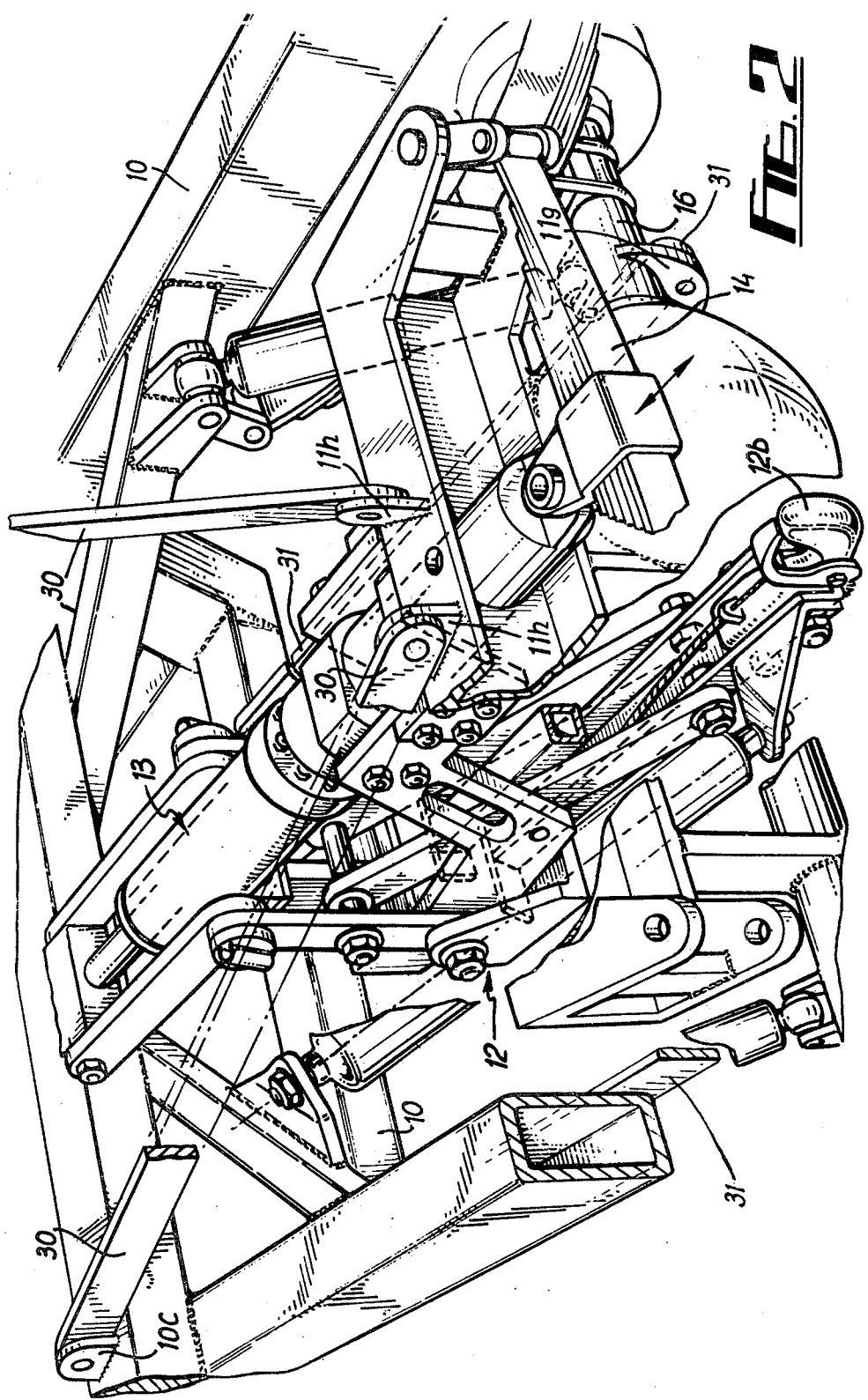

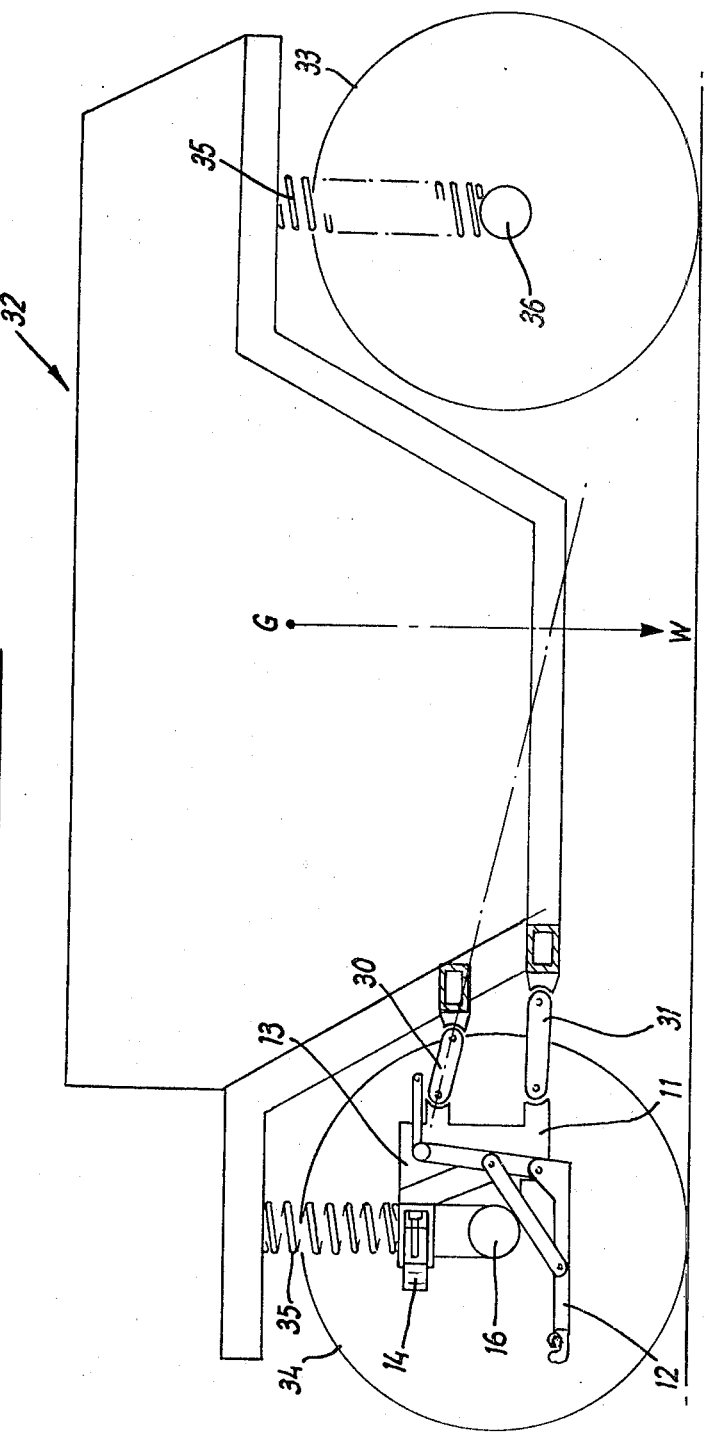

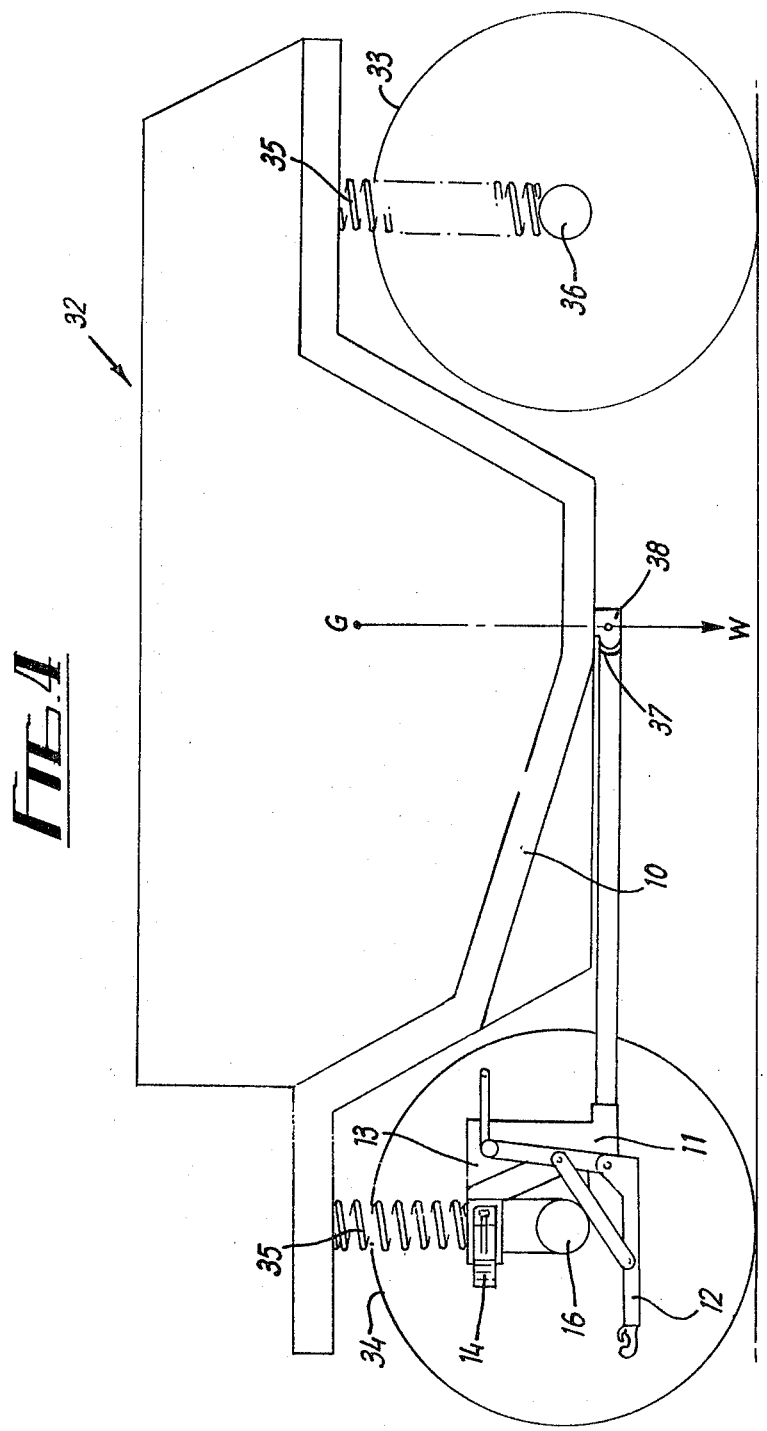

PICK-UP HITCH MOUNTING ARRANGEMENT

This invention relates to pick-up hitches by means of which a trailer or implement may be coupled to a vehicle. The invention also relates to such hitches as are fitted to a tractor vehicle of the sprung self-levelling type as is disclosed in our U.K. Pat. No. 1,370,363.

In the aforementioned Patent a sprung self-levelling pick-up hitch arrangement, which supports a trailer or implement load substantially independently of the tractor vehicle suspension, is described. Such an arrangement comprises a rigid support frame secured to the tractor rear axle. In the preferred embodiment described in the Patent the support frame is connected, by means of a universal coupling, to a rear part of the chassis of the vehicle, i.e. at a point distant from and behind the centre of gravity of the sprung mass of the vehicle.

Whilst such an arrangement has been found to be entirely suitable for many applications, it has been found that, if very heavy loads are applied to a hook or three-point linkage at a point or points behind the rear axle of the vehicle, the torque can cause the axle unit to twist about its axis. This produces an upward force at the universal coupling, which causes stretching of the rear suspension spring and inclination of the vehicle chassis.

It is an object of the present invention to provide a mounting arrangement for a pick-up hitch of the aforementioned type which overcomes, or at least alleviates to an appreciable extent the aforementioned effect on the vehicle spring and the chassis altitude.

The invention provides a pick-up hitch arrangement for a vehicle, comprising a rigid support frame adapted to be secured to a driven axle which forms a part of or is connected to said vehicle, said vehicle comprising a body part supported on resilient suspension means, and pick-up hitch means pivotally mounted upon the support frame, characterised in that pivotal attachment means are adapted to connect said hitch arrangement to said body part thereby to allow at least a limited range of pivotal movement of said hitch arrangement relative to said body part about an axis located substantially in vertical alignment with, or forwardly of, the centre of gravity of said body part.

The invention also provides a vehicle having a body part supported on resilient suspension means, a driven axle and a pick-up hitch arrangement comprising a rigid support frame secured to said axle and pick-up hitch means pivotally mounted on said support frame, characterised in that pivotal attachment means are adapted to connect said hitch arrangement to said body part thereby to allow at least a limited range of pivotal movement of said hitch arrangement relative to said body part about an axis located substantially in vertical alignment with, or forwardly of, the centre of gravity of said body part.

The pivotal attachment means may comprise a universal coupling located substantially in vertical alignment with or forwardly of, the centre of gravity of said body part.

Alternatively, the pivotal attachment means may comprise at least one upper link member and a respective lower link member or members each pivotally connected to said hitch arrangement and to said body part, and respective upper and lower link members are connected at spaced locations on said hitch arrangement and on said body part such as to provide that said respective link members extend in directions which converge at a point substantially in vertical alignment with, or forwardly of, the centre of gravity of said body part.

The pick-up hitch means may comprise a three-point linkage. Alternatively the pick-up hitch means may comprise a hitch and link assembly, in both cases resilient means may be mounted relative to said assembly and adapted to support said assembly in an operative position. Such a pick-up hitch arrangement may also comprise adjustable transmission means interposed between said resilient means and said assembly and adapted to stress the resilient means to maintain the hitch in a substantially constant operative position when under load.

The invention will now be described with reference to the accompanying drawings in which:

FIG. 1 is a perspective side elevation of one embodiment of pick-up hitch arrangement, FIG. 2 is a partly cut away perspective view from above and behind of the embodiment of FIG. 1, FIG. 3 is a diagrammatic side elevation of a vehicle with a second embodiment of pick-up hitch arrangement attached thereto; and FIG. 4 is a view similar to FIG. 2 of an alternative embodiment.

Referring now to FIGS. 1 and 2 there is shown a sprung self-levelling pick-up hitch arrangement comprising a support frame 11 secured to a driven axle 16 of a vehicle. A part of the chassis of the vehicle is shown at 10. A hitch and linkage assembly 12 is pivotally secured to the support frame 11 and includes a towing hook 12b by means of which a trailer may be towed by the vehicle. A spring 14 is mounted relative to the assembly 12 to support the same in an operative position as shown in full lines in FIG. 1, and adjustable transmission means in the form of a piston and cylinder unit 13 is interposed between the spring 14 and the assembly 12 to stress the spring 14 and maintain the hitch 12 in the operative position when under load.

The construction and operation of this arrangement is fully described in out U.S. Pat. No. 1,370,363 and therefore need not be repeated herein.

The support frame 11 is attached to the chassis 10 by means of pairs of upper and lower links 30, 31 respectively and each link 30,31 is pivotally attached to the support frame 11 at attachment points which lie substantially in the vertical plane of the rear axle 16 and to the chassis 10. The relative vertical spacing of lower and upper attachment lugs 10b, 10c on the chassis 10 is less than the corresponding relative vertical spacing of the lower and upper attachment lugs 11g, 11h on the support frame 11, so that links 30, 31 extend in directions which converge forwardly of and away from the axle 16, at a point which is in the vertical plane of or forwardly of the centre of gravity of the vehicle. Also the relative lateral spacing of the attachment points of upper links 30 to the chassis 10 is greater than that of the attachment points of links 30 to the support frame 10. By this means the rearwardly converging configuration of the upper links 30 serves to provide an appreciable degree of lateral stability to the hitch assembly. The point of convergence may be above, or behind but near to the rear axle 16 of the vehicle.

Referring now to FIG. 3 there is shown a vehicle 32 having a chassis or body part 10. Front and rear wheels 33,34 respectively support the chassis 10 by means of sprung suspension units 35. Mounted on the chassis 10 by means of upper and lower links 30 and 31 respectively is support frame 11 which is also secured to the rear axle 16 of the vehicle 32. Hitch and linkage assembly 12 is pivotally mounted on support frame 11 as is described above in relation to FIG. 1. As can be seen from FIG. 3 the upper and lower links 30, 31 extend in directions which converge forwardly of the rear axle 16, and in the embodiment shown the convergence occurs in a vertical plane passing through the centre of gravity G of the suspension supported chassis 10. Such vertical plane is represented by an arrow W depicting the sprung weight of the vehicle 32.

Referring now to FIG. 4 there is shown a vehicle 32 having a chassis, or body part 10, front and rear wheels 33,34, suspension units 35, support frame 11, hitch and linkage assembly 12 and rear axle 16 as in the previous embodiment. The support frame 11 is connected to the chassis 10 by means of a universal joint 37 whose pivot axis 38 is substantially in vertical alignment with the centre of gravity G of the sprung body or chassis 10.

In the event that the vehicle 32 has attached thereto a heavy trailer or implement with a hook 12b located at an appreciable distance between the axis of axle 16, a large torque will be applied about that axis and transmitted to the chassis 10 through the links 30, 31 or universal joint 37. The effects of such loading on the chassis 10 will be substantially equal, in the case of the configurations shown, on the front and rear suspension units 35, thus providing that the chassis 10 of the vehicle 32 maintains a substantially level altitude, since the sprung weight W opposes the torque loading on the axle 16 imposed by the overhanging load on the hook 12b, and the suspension units are relieved of load sufficient to balance the torque effect.

If the convergence of the longitudinal directions of links 30, 31, or the axis 38 is arranged to occur behind the vertical plane passing through the centre of gravity G then the vehicle 32 will assume a nose down altitude as a greater loading release occurs on the rear suspension unit than on the front suspension unit.

If the convergence of the longitudinal directions of links 30, 31, or the axis 38 is arranged to occur in front of the vertical plane passing through the centre of gravity G then the vehicle 32 will assume a nose up altitude as a greater loading release occurs on the front suspension unit than on the rear suspension unit. If this latter configuration is extended to the case of the convergence occurring in front of the front axle 36 of vehicle 32 then the loading on the rear suspension will be increased whilst that on the front suspension will be decreased.

In consequence, by means of the construction of the present invention any desired characteristics of behaviour of the vehicle 32 when towing heavy trailers or implements over rough terrain may be arranged. Furthermore the twisting of support frame 11 about axle 16 as occurred with the prior arrangement is completely or substantially eliminated by means of the present arrangement.

The embodiments shown in FIGS. 1 to 4 comprise hitches but the constructions shown are applicable equally to three-point linkage attachments. In the embodiments of FIGS. 1 and 2 and FIG. 3 upper links 30 or the lower links 31 may be arranged to converge rearwardly to provide lateral stability for the hitch arrangement.

I claim:

1. A pick-up hitch arrangement for a vehicle having a driven axle comprising a rigid support frame and means for securing said frame to said driven axle, said vehicle comprising a body part and resilient suspension means on which said vehicle is supported, and pick-up hitch means pivotally mounted on the support frame, wherein pivotal attachment means are provided which connect said hitch arrangement to said body part thereby to allow at least a limited range of pivotal movement of said hitch arrangement relative to said body part about an axis located not rearwardly of the centre of gravity of said body part.

2. A vehicle, having a body part, resilient suspension means supporting said body part, a driven axle and a pick-up hitch arrangement comprising a rigid support frame secured to said axle and pick-up hitch means pivotally mounted on said support frame, wherein pivotal attachment means are provided which connect said hitch arrangement to said body part thereby to allow at least a limited range of pivotal movement of said hitch arrangement relative to said body part about an axis located not rearwardly of the centre of gravity of said body part.

3. A vehicle according to claim 2 wherein the pivotal attachment means comprises a universal coupling located not rearwardly of the centre of gravity of said body part.

4. A vehicle according to claim 2 wherein the pivotal attachment means comprises at least one upper link member and for each upper link member a respective lower link member, each pivotally connected to said hitch arrangement and to said body part, and said respective upper and lower link members are connected at spaced locations on said hitch arrangement and on said body part such as to provide that said respective link members extend in directions which converge at a point not rearwardly of the centre of gravity of said body part.

5. A vehicle according to claim 4 wherein said pivotal attachment means comprises two upper and two lower link members.

6. A vehicle according to claim 5 wherein said upper link members extend in directions which converge not forwardly of said driven axle and said lower link members extend substantially parallel with each other.

7. A vehicle according to claim 5 wherein said lower link members extend in directions which converge not forwardly of said driven axle, and said upper link members extend substantially parallel with each other.

8. A vehicle according to claim 5 wherein said upper and lower link members are attached to said hitch arrangement at points substantially in vertical alignment with said driven axle.

9. A vehicle according to claim 2, wherein said pick-up hitch means comprises a three-point linkage.

10. A vehicle according to claim 2, wherein said resilient means is mounted relative to said hitch means and supports said hitch means in an operative position.

11. A vehicle according to claim 10, wherein adjustable transmission means is interposed between said resilient means and said hitch means to stress said resilient means to maintain said hitch means in a substantially constant operative position when differing hitch loads are applied.

12. A vehicle according to claim 11 wherein said adjustable transmission means comprises a piston and cylinder device.

* * * * *